United States Patent
Yadav et al.

(10) Patent No.: US 10,098,066 B2
(45) Date of Patent: Oct. 9, 2018

(54) AUXILIARY BACK-OFF TO AVOID BATTERY AND NETWORK RESOURCE DEPLETION IN VARIABLE NETWORK CONDITIONS

(71) Applicant: Microsoft Technology Licensing, LLC, Redmond, WA (US)

(72) Inventors: Mahesh Yadav, Redmond, WA (US); Taehwan Jung, Issaquah, WA (US); Srinivasa Rao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 15/194,478

(22) Filed: Jun. 27, 2016

(65) Prior Publication Data

US 2017/0374620 A1    Dec. 28, 2017

(51) Int. Cl.
| | |
|---|---|
| *G01R 31/08* | (2006.01) |
| *H04L 12/28* | (2006.01) |
| *H04B 7/00* | (2006.01) |
| *H04J 3/16* | (2006.01) |
| *H04W 52/02* | (2009.01) |
| *H04M 1/725* | (2006.01) |
| *H04W 4/12* | (2009.01) |

(Continued)

(52) U.S. Cl.
CPC ... *H04W 52/0229* (2013.01); *H04M 1/72583* (2013.01); *H04W 4/12* (2013.01); *H04W 48/06* (2013.01); *H04W 76/18* (2018.02)

(58) Field of Classification Search
CPC ......... H04W 52/0238; H04W 52/0245; H04W 52/243; H04W 52/26; H04W 56/002
See application file for complete search history.

(56) References Cited

U.S. PATENT DOCUMENTS

| | | |
|---|---|---|
| 9,078,257 B2 | 7/2015 | Fong et al. |
| 2009/0003214 A1 | 1/2009 | Vaswani et al. |

(Continued)

OTHER PUBLICATIONS

"Retry Pattern", Retrieved on: Mar. 18, 2016 Available at: https://msdn.microsoft.com/en-us/library/dn589788.aspx.

(Continued)

*Primary Examiner* — Brian Roberts
*Assistant Examiner* — Abu-Sayeed Haque
(74) *Attorney, Agent, or Firm* — Ray Quinney & Nebeker, P.C.; Thomas M. Hardman; Qudus Olaniran

(57) ABSTRACT

The embodiments of the disclosure include methods and apparatus that provide back-off procedures for avoiding device/network resource depletion in bad network conditions. A device user may selectively enable an auxiliary back-off procedure that extends the time between network service requests. For example, the auxiliary back-off procedure may be used if the device determines an attach request is unsuccessful when a reject message is received from the network and the reject message indicates a reject cause for which the device has no defined back-off to follow. The auxiliary back-off procedure may be also be used if the device determines that a service request is unsuccessful when the service request is ignored, i.e. no response is received from the network, or, when a service request reject is received from the network and the reject message indicates a reject cause for which the device has no defined back-off to follow.

20 Claims, 7 Drawing Sheets

(51) Int. Cl.
*H04W 48/06* (2009.01)
*H04W 76/18* (2018.01)

(56) References Cited

U.S. PATENT DOCUMENTS

| | | | |
|---|---|---|---|
| 2010/0159990 A1* | 6/2010 | Johnstone | H04W 48/04 455/561 |
| 2011/0141969 A1* | 6/2011 | Sridhara | H04W 74/0833 370/328 |
| 2012/0163265 A1 | 6/2012 | Kotecha et al. | |
| 2012/0176941 A1 | 7/2012 | Bata et al. | |
| 2012/0287851 A1* | 11/2012 | Lee | H04W 48/02 370/328 |
| 2013/0148497 A1 | 6/2013 | Chan et al. | |
| 2013/0170479 A1* | 7/2013 | Fong | H04W 74/085 370/336 |
| 2013/0203389 A1 | 8/2013 | Tiwari | |
| 2014/0056220 A1 | 2/2014 | Poitau et al. | |
| 2015/0109917 A1 | 4/2015 | Lu et al. | |
| 2015/0126147 A1* | 5/2015 | Koskela | H04W 4/90 455/404.1 |
| 2015/0173074 A1 | 6/2015 | Zhao et al. | |
| 2015/0195216 A1 | 7/2015 | Di Pietro et al. | |
| 2015/0208352 A1 | 7/2015 | Backholm et al. | |
| 2016/0212666 A1* | 7/2016 | Zalzalah | H04W 28/16 |
| 2016/0285591 A1* | 9/2016 | Dortmund | H04L 1/1877 |
| 2017/0230895 A1* | 8/2017 | Zhang | H04W 76/18 |
| 2018/0007590 A1* | 1/2018 | Karout | H04W 76/10 |

OTHER PUBLICATIONS

"LTE and Beyond", Retrieved on: Jun. 26, 2016 http://www.lteandbeyond.com/2013/09/lte-emm-eps-mobility-management-timers.html.

"LTE Timers", Retrieved on: Jun. 26, 2016 http://www.rfwireless-world.com/Terminology/LTE-timers.html.

3GPP TS 24.301 V13.5.0 (Mar. 2016) Retrieved on Jun. 26, 2016, pp. 159 to 184.

3GPP TS 36.331V12.9.0 (Mar. 2016) Retrieved on Jun. 26, 2016, pp. 189 to 190.

"3rd Generation Partnership Project; Technical Specification Group Core Network and Terminals; Mobile Radio Interface Layer 3 Specification; Core Network Protocols", In 3rd Generation Partnership Project Meeting, Mobile Competence Centre, vol. CT WG1, 3GPP TS 24.008, V14.0.0, Jun. 24, 2016, 754 Pages.

"3rd Generation Partnership Project; Technical Specification Group Core Network and Terminals; Non-Access-Stratum (NAS) Protocol for Evolved Packet System (EPS)", In 3rd Generation Partnership Project Meeting, vol. CT WG1, 3GPP TS 24.301, V14.0.0, Jun. 24, 2016, 452 Pages.

"3rd Generation Partnership Project; Technical Specification Group Core Network and Terminals; Non-Access-Stratum (NAS) Protocol for Evolved Packet System (EPS)", In 3rd Generation Partnership Project Meeting, Mobile Competence Centre, vol. CT WG1, 3GPP TS 24.301, V113.0, Jun. 25, 2012, 335 Pages.

"3rd Generation Partnership Project; Technical Specification Group Services and System Aspects; System Improvements for Machine-Type Communications (MTC)", In 3rd Generation Partnership Project Meeting, Mobile Competence Centre, vol. SA WG2, 3GPP TR 21888, V11.0.0, Sep. 18, 2012, 165 Pages.

"Congestion Control by SCSN/MME", In 3GPP Draft, Mobile Competence Centre, Jun. 29, 2010, 4 Pages.

"Summary of Offline Discussions on Wait Timer Handling at AS or NAS Level", In 3rd Generation Partnership Project, TSG-RAN WG2 #72, Nov. 15, 2010, 11 Pages.

"International Search Report and Written Opinion Issued in PCT Application No. PCT/US2017/037091", dated Sep. 25, 2017, 15 Pages.

* cited by examiner

AUXILIARY BACK-OFF TO AVOID BATTERY AND NETWORK RESOURCE DEPLETION IN VARIABLE NETWORK CONDITIONS

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

The embodiments of the disclosure include methods and apparatus that provide auxiliary back-off procedures for avoiding battery and/or network resource depletion in bad or unfavorable network conditions. The methods and apparatus allow a device user to selectively enable or disable an auxiliary back-off procedure that, when enabled, extends the time between unsuccessful service requests sent from the device to a network. When a service request is unsuccessful, and when the device is not configured to perform a defined back-off procedure in the event the unsuccessful service request is caused by a particular cause, the auxiliary back-off procedure may be used for that particular cause. In an example implementation, the auxiliary back-off procedure may be used if the device determines that a service request is unsuccessful and no response is received from the network (i.e., when the service request is not received by the network or when the service request is ignored by the network). The auxiliary back-off procedure may also be used when a service request reject message is received from the network and the service request reject message indicates a reject cause, i.e., includes a reject code, for which the device has no defined back-off to follow.

The embodiments include a device that may be configured to transmit a network service request to a network, determine that the network service request has been unsuccessful based on an event, determine if a back-off procedure is not defined for the event, and, if a back-off procedure is not defined for the event, determine if an auxiliary back-off procedure is enabled. The device may then perform the auxiliary back-off procedure if it is determined that the auxiliary back-off procedure is enabled, or, the device may be configured to transmit one or more second network service requests without using back-off if it is determined that the auxiliary back off procedure is disabled. In an example implementation, the device may be configured to receive input at a user interface that enables or disables the auxiliary back-off procedure. The event by which the network service request is determined unsuccessful may comprise the event of receiving a service request reject message. The determining if a back-off procedure is not defined for the event may include determining if the service request reject message includes an indication of a reject cause or reject code for which the device has no defined back-off to follow for that specific cause or reject code. The event on which the network service request is determined unsuccessful may also comprise an occurrence of a service request being ignored by a network, i.e., no response has been sent by the network after the device has sent one or more service requests.

In an implementation, the auxiliary back-off may comprise use of a maximum service request attempt counter. When the auxiliary back-off is initiated, the device may be allowed to transmit up to a maximum number of service requests, as tracked by the counter, before an auxiliary back-off timer is started. The device may then refrain from transmitting service requests during the time the auxiliary back-off timer runs. When the auxiliary back-off timer expires, the device may then again transmit service requests until a service request is successful or until the maximum number of unsuccessful service requests has again been transmitted.

In another implementation, auxiliary back-off may be used for particular reject causes even though those particular reject causes may be associated with a defined back-off. In this implementation, the auxiliary back-off may be used to supplement or replace defined back-off. For example, particular defined reject causes may be treated as excepted defined reject causes and auxiliary back-off may be initiated when a service reject message includes the excepted defined reject causes. In one example, the auxiliary back-off may be implemented for use when a service request sent to a network is unsuccessful and a service reject message is received from the network including a reject cause and an associated network indicated back-off timer by which the network defines a back-off procedure to the device. In this example where the network defines the back-off in the service reject message, the received reject cause and the associated network indicated back-off timer may be considered an excepted defined reject cause based on the inclusion of the particular type of back-off timer.

DETAILED DESCRIPTION

Figure 1A:
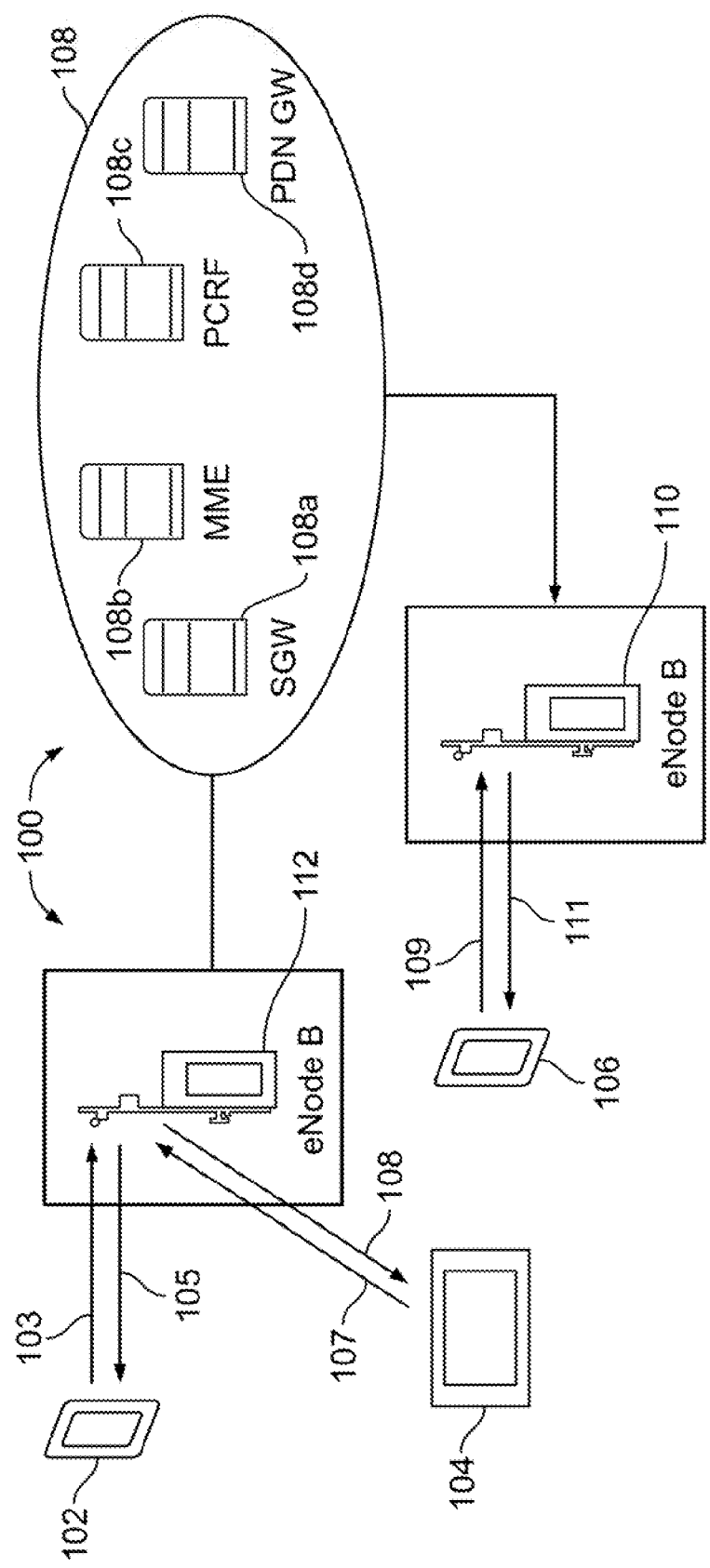
FIG. 1A is a simplified diagram illustrating an example network into which an embodiment of the disclosure may be implemented.

The system and method will now be described by use of example embodiments. The example embodiments are presented in this disclosure for illustrative purposes, and not intended to be restrictive or limiting on the scope of the disclosure or the claims presented herein.

When a device is operating within the coverage area of a wireless network, the device may attempt to access network service while in the idle state by sending a service request to request data bearer channels from the network. In cases where the network cannot grant service requests from a device, the network may reject the service requests by sending reject messages in response to the service request messages. The device may then end up sending repeated service requests to the network.

If the network continues to send service request reject messages in response to service requests, the device may end up repeatedly resending unsuccessful service requests. The device may also end up repeatedly resending unsuccessful service requests when the service requests are purposely ignored, or not received, by a network and the device receives no response at all to repeatedly resent service request messages. In some wireless networks, the service request messages could be sent at a high frequency of 3-4 service requests per minute. In networks having persistently bad network congestion problems or weak RF signal conditions that prevent a network from granting service to a device, the device could get stuck repeatedly resending unsuccessful service requests. Repeatedly sending unsuccessful service requests that have a small chance of being granted may cause unnecessary device battery drain and high network RF channel resource consumption/congestion.

Some wireless network standards require that devices follow a specific defined back-off procedure for service requests that are rejected by a network for a specific reason or cause. The cause for a reject is commonly sent as an information element in a service reject message. The defined back-off procedure specifies a procedure for reducing the number of service request attempts over a time period. For example, the third generation partnership project (3GPP) specifications for long term evolution systems (LTE) specify back-off procedures for the situation in which a service request reject message includes one of a set of specific service request reject codes. However, the 3GPP specifications do not specify device behavior for situations in which certain service request reject codes that are not associated with a defined back-off procedure are returned in a service request reject message. Also, defined back-off procedure are not specified for 3GPP devices for situations in which a device receives no response to service requests because the network receives the service requests and decides not to respond, or the network does not receive the service requests and cannot respond.

The disclosed embodiments provide a technical advantage in that a user of a device may selectively enable or disable an auxiliary back-off procedure based on network conditions. Selective enablement of the auxiliary back-off avoids battery and network resource depletion when auxiliary back-off would be useful in bad network conditions. Selective disablement of the auxiliary back-off al lows a user to avoid unnecessary time spent its auxiliary back-off when back-off is not necessary, such as when network conditions are favorable. In implementations, a device user may enable or disable the auxiliary back-off at a user interface on the device. When the auxiliary back-off is enabled, the device will use the auxiliary back-off procedure after sending one or more unsuccessful network service requests, where the cause for the one or more unsuccessful service request is not defined as a trigger for a specific defined back-oft procedure in the device. When the auxiliary back off is disabled, the device will not use the auxiliary back-off procedure after sending one or more unsuccessful service requests, where the reasons for the one or more unsuccessful service requests is not defined as a trigger for a specific back-off procedure in the device.

The cause for unsuccessful service requests that are not defined as a trigger for specific defined back-off procedures may include a service reject message being received in response to a service request, when the service reject message indicates an undefined service reject. An undefined service reject cause is not associated with a defined back-off. Additionally, the reasons for unsuccessful service request that are not defined as a trigger for a defined back-off may include not receiving any response from a network, when a service request is effectively ignored. The cases in which the network ignores the service request includes cases in which the network receives the service request and the network does not respond for some reason, or cases in which the service request is not received by the network, so no response is sent.

Implementations of the embodiments provide an advantage in cases when network service conditions are bad and the chances far a service request grant for any consecutive service requests are low. In these cases of bad network service conditions, if the auxiliary back-off is enabled, wasteful multiple service requests may be avoided for undefined reject causes. The embodiments also provide an advantage when network service conditions are good and the chances for a service request grant for any consecutive service requests are relatively high. In these cases of good network service conditions, the user may disable the auxiliary back-off and prevent the device from spending wasteful time performing the auxiliary back-off procedure for undefined reject causes.

In implementations, enabling the auxiliary back-off procedure may provide an advantage in situations in which a device is used in multiple networks operated by different service providers. For example, a device that is configured according to the requirements of one service provider may be configured with program instructions defining that a particular defined service reject cause, indicated by a reject code in a service request reject message sent by a network, will trigger a specific defined back-off procedure for that reject cause. The device may be configured with memory including a set of defined reject codes, each code indicating a cause for the service request rejection and each code associated with a specific defined back-off procedure. However, the set of defined reject codes may differ between each of multiple service providers. When a device configured for a network operated by first service provider is operated in a network of a second service provider, the device may receive a service reject message indicating a reject code which is not in its set of defined reject codes. Also, a service provider may introduce new reject codes that are unknown to a device that may operate in the service provider's network. When an undefined/unknown reject code is received in a service reject message, a device without any auxiliary back-off capability would not perform any defined back-off and would repeatedly send service requests. In these situations, if the auxiliary back-off is enabled, the device may then use the auxiliary back-off to avoid repeatedly sending unsuccessful service requests. The capability to selectively enable or disable the auxiliary back-off procedure also provides an advantage in operation in multiple networks. Ira visited network provides bad network service, i.e., has bad coverage or is crowded to capacity level, the auxiliary back-off may be enabled. If a visited network provides good network service, the auxiliary back-off may be disabled to avoid wasting time in back-off.

Use of the embodiments provides an advantage over currently used methods. For example, currently used 3GPP LTE back-off methods only initiate back-off procedures for defined reject codes when a reject cause is indicated in a service request reject message. If a service request reject message is received that indicates an undefined or unknown reject code, no back-off procedure is specified for 3GPP LTE systems and a device does not perform back-off. In certain cases a device may repeatedly resend service requests to the network until it runs out of power or is shut down. This wastes device power and may contribute to crowding on network resources such as access channels. Certain service providers have specified that their subscriber device operating systems should include defined back-off procedures for additional defined reject codes that the service providers add from time to time, but this does not prevent the problems of operating in networks operated by multiple service providers discussed above, because the additional defined reject codes may differ between networks in which a device may operate. It also does not account for the situation in which a service provider specifies new reject causes having defined back-offs that are not updated in a subscriber device and are unknown to the subscriber device. The auxiliary back-off on the disclosure provides an auxiliary back-off that may be used in these situations where reject codes are unknown to a device and defined back-off is not available. Additionally, for the case in which a service request is ignored by a network, 3GPP LTE systems are not specified to perform back-off. In both of these cases the auxiliary back-off of the embodiments may be enabled or disabled to perform back-off in appropriate network conditions.

The embodiments also provide an advantage in an implementation in which the auxiliary back-off may be used to supplement or replace defined back-off. For example, particular defined reject causes may be treated as excepted defined reject causes and auxiliary back-off may be initiated when a service reject message includes the excepted defined reject causes. For example, the auxiliary back-off may be implemented for use when a service request sent to a network is unsuccessful and a service reject message is received from the network including a reject cause and an associated particular network defined back-off timer by which the network defines a back-off procedure. In this type of situation without the auxiliary back-off, when the network sends a reject cause and an associated defined back-off, and network conditions are bad, the device would continue to send service requests at time intervals according to the intervals defined for the timer indicated in the service reject. Even though there was some defined back-off performed according to the associated timer value, problems with device power consumption or network depletion may occur when multiple service requests were resent. The implementation using excepted defined back-off causes allows a device user to selectively enable or disable auxiliary back-off for excepted defined reject causes so that features of auxiliary back-off, such as the maximum attempt counter, may be used. The auxiliary back-off procedure may be implemented to start after the excepted defined back-off is initially performed or an initial portion of the excepted defined back-off is performed.

Referring now to FIG. 1A, therein is a simplified diagram illustrating an example network into which an embodiment of the disclosure may be implemented. FIG. 1A shows a system 100 including core network infrastructure 108, eNode B 110, and eNode B 112. Core network infrastructure includes serving gateway (SOW) 108a, mobility management entity (MME) 108b, policy and charging rules function (PCRE) 108c, and packet data network gateway (PDN GW) 108d. SOW 108a, MME 108b, PCRF 108c, and PDN GW 108d provide the functions for overall control and management of network 100. The eNode B 110 and eNode B 112 provide radio channel interfaces for voice and data communications between the core network 108 and devices such as devices 102, 104 and 106. Example devices 102, 104, and 106 are shown operating in the RF coverage area of eNode B 110 and erode B 112. Devices 102, 104, and 106 may be configured to include appropriate circuitry/processors and program instructions that perform auxiliary back-off according to embodiments of the disclosure. Device 102 is shown transmitting signals on an uplink channel 103 from to eNode B 112 and receiving signals on downlink channel 105 from eNode B 112. Similarly device 104 is shown transmitting signals on an uplink channel 107 to eNode B 112 and receiving signals on downlink channel from eNode B 112, and, device 106 is shown transmitting signals on an uplink channel 109 to eNode B 110 and receiving signals on downlink channel 111 from eNode B 110. In an example scenario, the uplink signals 103, 107, and 109 may include service requests sent to request service from the network 100, and the downlink signals may comprise signals sent by the network 108 in response to the service requests.

Figure 1B:
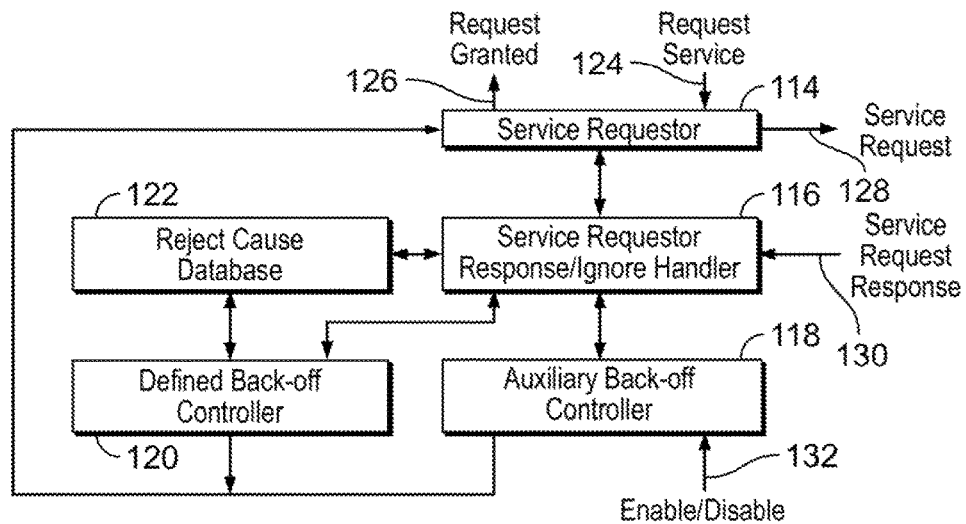
FIG. 1B is a simplified block diagram illustrating portions of an example device.

Referring now to FIG. 1B, therein is a simplified block diagram illustrating portions of an example device. FIG. 1B shows example functional blocks that may be configured within a device, such as devices 102, 104, and 106 of FIG. 1A in an example implementation of auxiliary back-off. The functional blocks of FIG. 1B may be the portions of the device that control the auxiliary back-off FIG. 1B shows service requestor 114, service request response/ignore handler 116, auxiliary back-off controller 118, defined back-off controller 120, and reject cause database 122. The functional blocks of FIG. 1B may be configured with any appropriate circuitry/processors and program instructions that perform auxiliary back-off according to embodiments of the disclosure. The operation of the functional blocks of FIG. 1B may be explained with reference to the flow diagram of FIG. 2A.

Figure 2A:
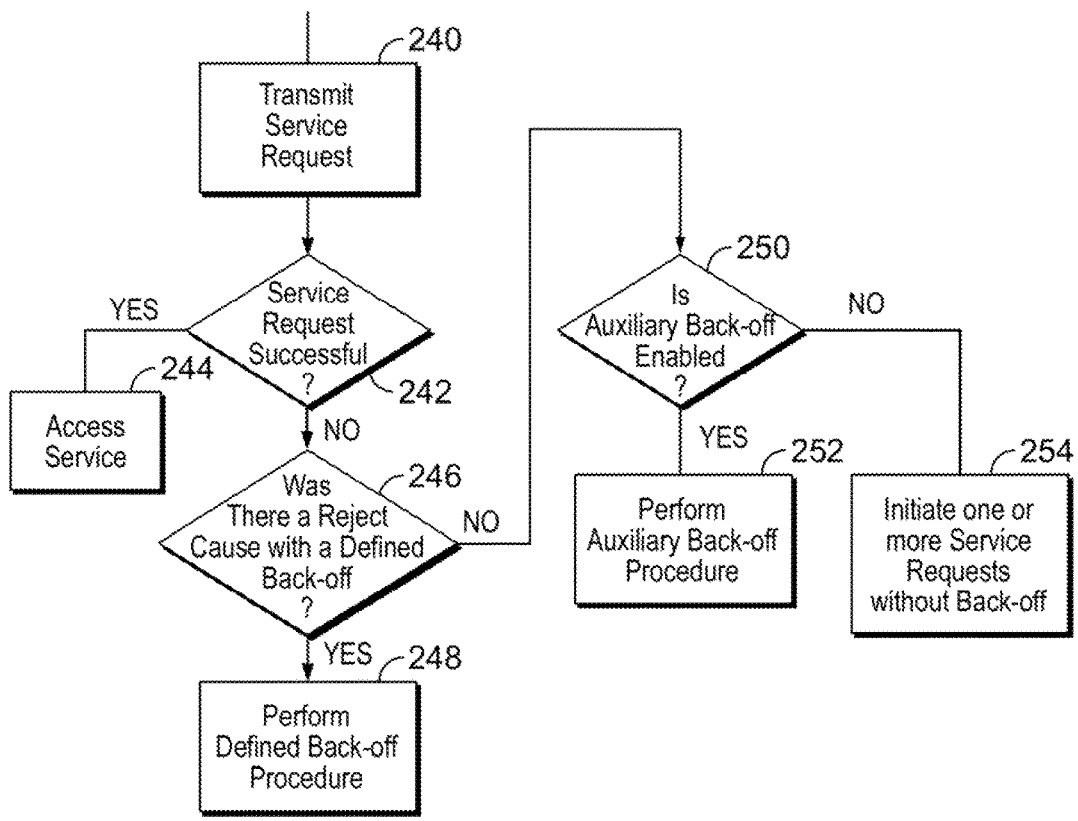
FIG. 2A is a flow diagram illustrating operations performed in an example device.

FIG. 2A is a flow diagram illustrating operations performed in an example device. FIG. 2A may be explained using device 102 of FIG. 1A as an example device that includes circuitry/processors and program instructions configured to implement the functional blocks of FIG. 1B. The process begins at 240 where device 102 transmits a service request on uplink 103 to eNode B 112. Service requestor 114 of FIG. 1B may initiate transmission of the service request on uplink 103 upon receiving a request service signal 124 generated within device 102 when device 102 needs service on data bearer channels. This may occur when device 102 has outgoing data to transmit or upon device 102 receiving a page from network 108 indicating that the network has data to be transmitted to device 102. Service requestor 114 may then generate a service request signal 128 within device 102 that causes device 102 to transmit the service request on uplink 103.

At 242, device 102 determines whether or not the service request was successful. Service request response/ignore handler 116 may perform the determination at 242 based on an event that may include receiving an indication of a service request response 130 provided by a receiver of device 102. As part of the determination at 242 service request response/ignore handler 116 may also perform the determination as to whether the service request was ignored at 242 based on the event of not receiving or receiving a service request response from the network within a predetermined time period after the service request was sent.

If service response/ignore handler 116 determines at 242 that a service request response indicates the service request was successful the process moves to 244. At 244 service response/ignore handler 116 provides an indication to service requestor 114 of the successful access and service requestor 114 provides a request granted indication 126 to the device. Device 102 then accesses service on the requested data bearer channels.

If service response/ignore handler 116 determines at 242 that the service request response was unsuccessful, i.e., a service request response includes a reject message, or, no response was received to the service request within the predetermined time period because the service request was received by the network and ignored, or because the service request was not received by the network, the process moves to 246.

At 246, service response/ignore handler 116 determines whether any service request response was received from network 100 indicating a reject cause for the unsuccessful service request. If no service request response was received from network 100 because the network did not receive or ignored the request the process moves to 250.

If, however, at 246 it is determined that service request response including a reject cause was received, service request response/ignore handler 116 sends a query to reject cause database 122 to determine if the indicated reject cause is defined and associated in device 102 with a defined back-off procedure. If the indicated reject cause is associated with a defined back-off procedure, the process moves to 248 where service request response/ignore handler 116 sends an indication to defined back-off controller 120 indicating that defined back-off controller 120 should control service requestor 114 to perform the defined back off procedure. If the indicated reject cause is not associated in device 102 with a defined back-off procedure, the process moves to 250.

At 250, service request response/ignore handler 116 sends a query to auxiliary back-off controller 118 to determine whether or not the auxiliary back-off is enabled. Auxiliary back-off may be selectively enabled or disabled by auxiliary back-off controller 118 receiving an enable disable signal 132 generated by a user interface on device 102. The user interface may be configured to allow a user to select whether or not auxiliary back-off is to be enabled. In alternative implementations, the enable/disable signal 132 received at auxiliary back-off controller 118 may be generated upon device 102 receiving a remote control signal. For example, device 102 may receive a control signal sent over the internet or receive control signal sent from network 100 by an operator of network 100.

If the auxiliary back-off is not enabled, the process moves to 254 and service request response/ignore handler 116 sends an indication to service requestor 114 to continue without auxiliary back-off. Service requestor 114 then initiates the transmission of subsequent service requests without using any back-off. If service request response/ignore handler 116 determines that auxiliary back-off is enabled, the process moves to 252 where auxiliary back-off controller 118 performs auxiliary back-off by controlling service requester 114 and service request response/ignore handler 116.

The auxiliary back-off performed at 252 by auxiliary back-off controller 118 may include use of a maximum attempt counter that controls service requestor 114 so that service requester 114 may initiate transmission of multiple unsuccessful service requests before the auxiliary back-off is actually initiated, in an implementation of this maximum attempt counter in FIG. 1B, the auxiliary back-off controller 118 may keep a count of unsuccessful service requests. This may include service requests with network responses indicating an undefined reject cause, or unsuccessful service requests that were ignored by the network. If the maximum attempt counter is less than a predetermined value for maximum allowed unsuccessful attempts, the auxiliary back-off controller 118 will control service request response/ignore handler 116 and service requestor 114 to continue to retransmit service requests until the maximum number of unsuccessful attempts is reached. When the maximum number of allowed unsuccessful attempts is reached by the maximum attempt counter, auxiliary back-off controller 118 initiates an auxiliary back-off timer and provides appropriate signals to indicate to service requestor 114 and service response/ignore handler 116 that service requests are not to be transmitted during the auxiliary back-off period. When the auxiliary back-off timer expires, the process returns to 240 and service requestor 114 and service response/ignore handler 16 start the process of sending service requests again.

Figure 2B:
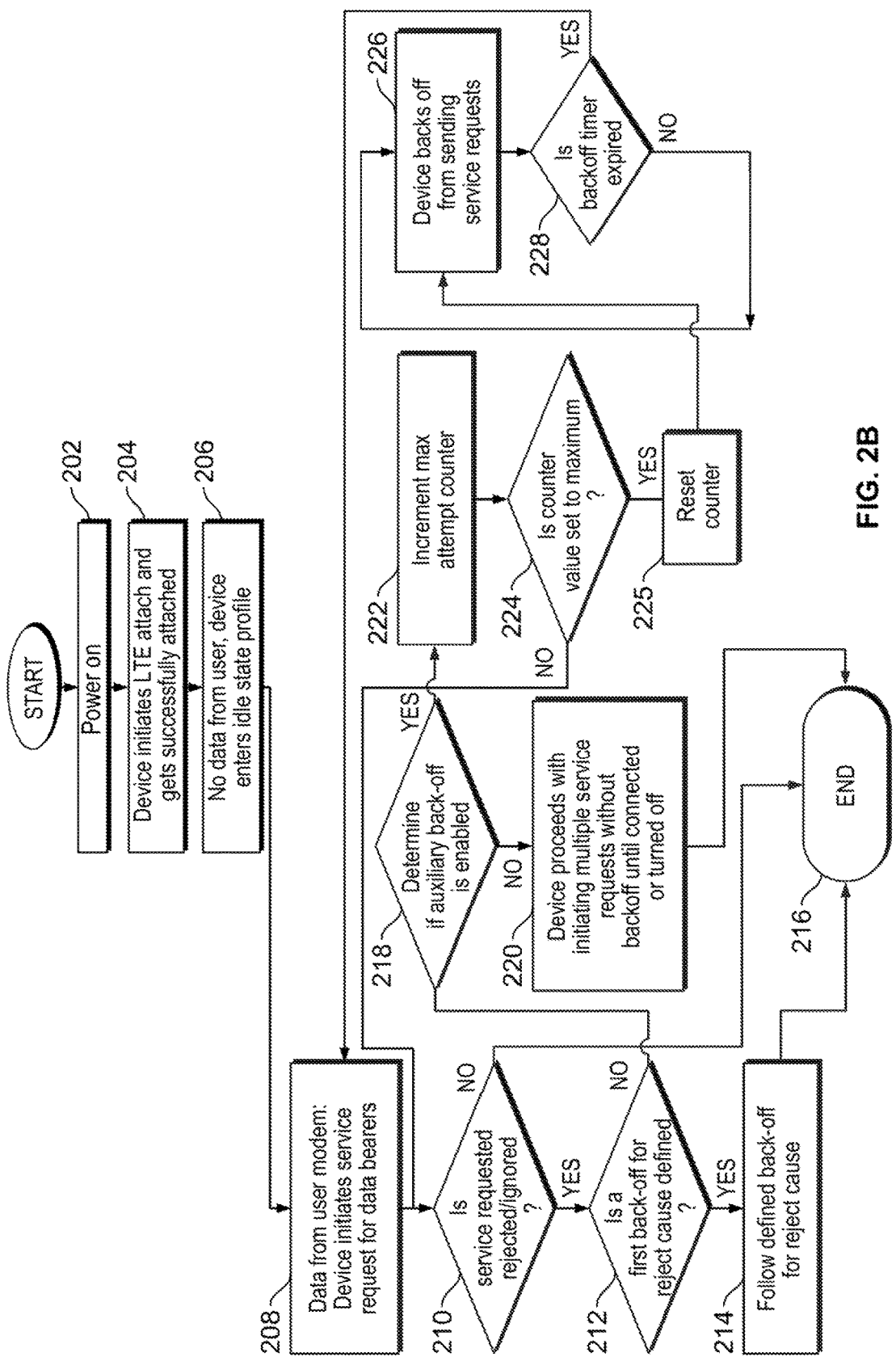
FIG. 2B is a flow diagram illustrating operations performed in an example device according to an implementation of FIG. 2A.

Referring now to FIG. 2B, therein is a flow diagram illustrating operations performed in an example device according to an implementation of FIG. 2A, FIG. 2B may be explained with reference to FIGS. 1A and 1B using device 102 and network 100 as an example device and network operating according to the LTE standard.

The process of FIG. 2B begins at 202 where device 202 is powered on. At 204, device 102 transmits a network access request on uplink 103 and receives an access grant response on downlink 105 to successfully attach to LTE network 100. At 206, device 102 has no data to transmit and enters the idle state.

At 208, device 102 determines it has data to transmit and initiates a service request for one or more data bearer channels. Service requestor 114 may initiate transmission of the service request by device 102 on uplink 103 upon receiving request service signal 124 generated by the user modem within device 102. Service requestor 114 may generate a service request signal 128 that causes device 102 to transmit a service request message to network 100 on uplink 103.

At 210, device 102 determines whether or not the service request was rejected or ignored. Service request response/ignore handler 116 may perform the determination of whether the service request was rejected at 210 based on an indication of the service request response 130 provided to service request response/ignore handler 116 by the receiver of device 102, which received the service request response on downlink 105. As part of the determination at 210 service request response/ignore handler 116 also performs the determination as to whether the service request was ignored at 210 based on whether or not any service request response was received from the network within a predetermined time period after the service request was sent.

If service response/ignore handler 116 determines at 210 that a service request response indicates that the service request was not rejected or ignored the process moves to 216. At 216, the process ends as service response/ignore handler 116 provides an indication to service requestor 114 of the successful access, and service requestor 114 provides a request granted indication 126 to device 102.

If service response/ignore handler 116 determines at 210 that the service request response was rejected or ignored, i.e., a service request response includes a reject message, the service request was received by the network 100 and ignored, or the service request was not received by the network and effectively ignored, the process moves to 212.

At 212, service response/ignore handler 116 determines whether a service request response was received from network 100 indicating a reject cause and, if there is a reject cause, whether the indicted reject cause is associated with a defined back-off procedure. If, at 212, it is determined that an indicated reject cause is defined and associated in device 102 with a defined back-off procedure, the process moves to 214. At 214, service response/ignore handler 116 sends an indication to defined back-off controller 120 indicating that defined back-off controller 120 should control service requestor 114 to perform the defined back off procedure for the reject cause.

If, however, at 212 service response/ignore handler 116 determines that the indicated reject cause in the response from the network 100 is not defined and not associated in device 102 with a defined first back-off procedure, or, there is no indicated reject cause because the service request was ignored for a predetermined time period, the process moves to 218

At 218, service response/ignore handler 116 sends a query to auxiliary back-off controller 118 to determine whether or not the auxiliary back-off is enabled. If the auxiliary back-off is not enabled, the process moves to 220 and response/ignore handler 116 sends an indication to service requester 114 to continue without auxiliary back-off. Service requestor 114 then initiates the transmission of subsequent service requests without using auxiliary back-off until device 102 receives access or is powered off. If, however, service request response/ignore handler 116 determines that auxiliary back-off is enabled, service response/ignore handler 116 provides an indication to auxiliary back-off controller 118 to initiate auxiliary back-off and the process moves to 222.

At 222, auxiliary back-off controller 118 increments a maximum attempt counter and at 224 determines whether the maximum attempt counter is set to a predetermined maximum value for allowed unsuccessful service requests. If the maximum attempt counter is less than the predetermined maximum value the process returns to 208 where auxiliary back-off controller 118 indicates to service requestor 114 to retransmit the service request. The loop back from 222 to 208 will occur to initiate repeated service requests until the service request is determined successful at 210, until it is determined that a response from the network includes a cause for which a defined back-off exists at 212, or until the predetermined maximum value is reached by the maximum attempt counter at 224.

When, at 224, auxiliary back-off controller 118 determines that the predetermined maximum value has been reached by the maximum attempt counter the process moves to 225. At 225, auxiliary back-off controller 118 resets the maximum attempt counter and the process moves to 226.

At 226, Auxiliary back-off controller 118 starts an auxiliary back-off timer and provides appropriate signals to indicate to service requestor 114 and service response/ignore handler 116 that service requests are not to be transmitted during the back-off period while the timer is running. For example, the auxiliary back-off timer may be set to run for a period of x minutes during which no service requests may be transmitted. At 228, auxiliary back-off controller 118 determines whether or not the auxiliary back-off timer has expired. If the auxiliary back-off timer is not expired, the process returns to 226 and auxiliary back-off controller continues to control device 102 to back-off from sending service requests. When auxiliary back-off controller 118 determines that the auxiliary back-off timer has expired, the process returns to 208 where service response/ignore handler 116 indicates to service requestor 114 and service response/ignore handler 116 to retransmit the service request and start the service request process again.

Figure 2C:
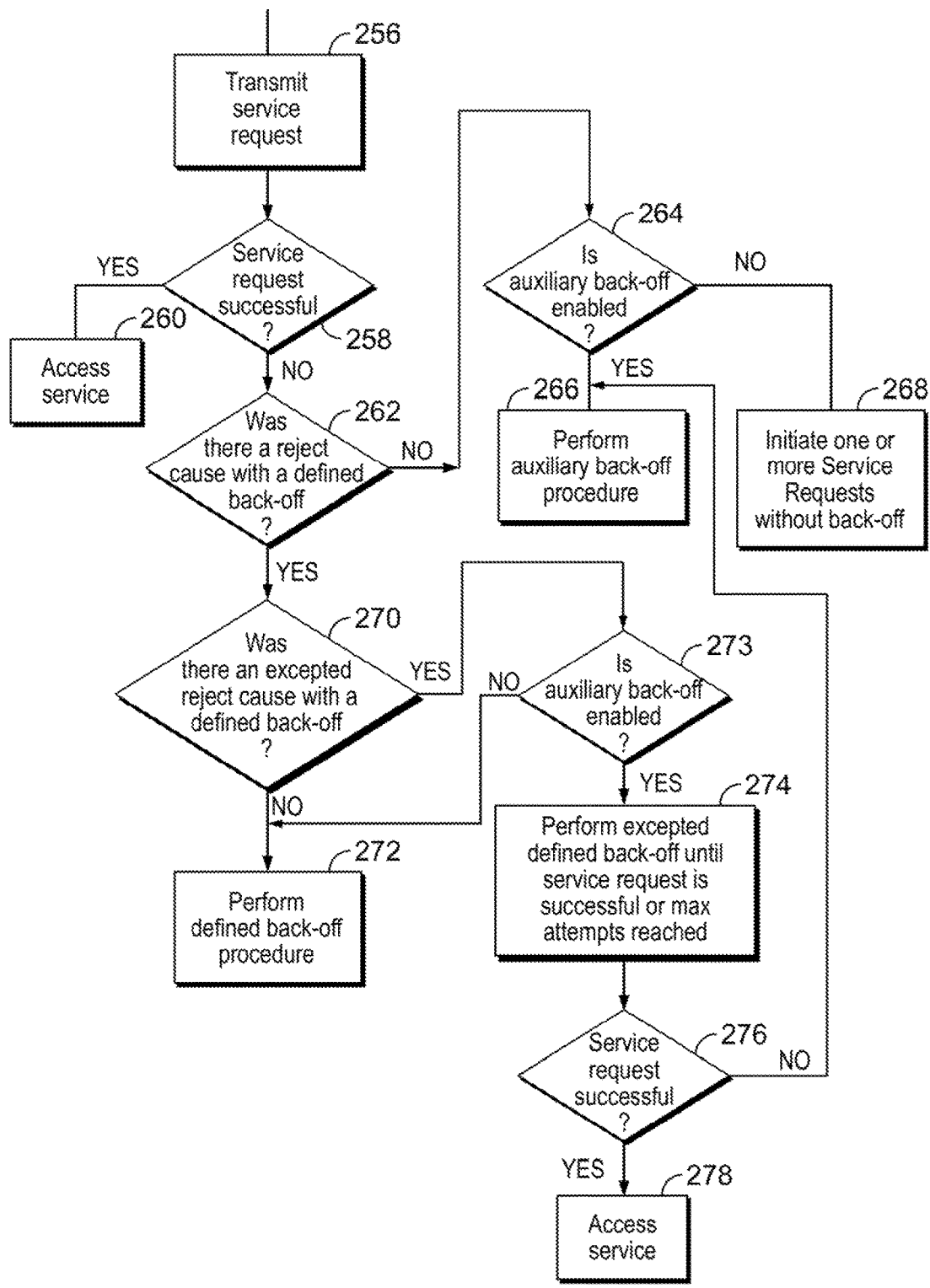
FIG. 2C is a flow diagram illustrating operations performed in another example device.

Referring now to FIG. 2C, therein is a flow diagram illustrating operations performed in another example device. FIG. 2C shows an implementation of FIG. 1A that includes additional operations. In FIG. 2C, the process allows auxiliary back-off to be used for particular reject causes even though those particular reject causes may be associated with a defined back-off. In this implementation, the auxiliary back-off may be used to supplement or replace defined back-off. For example, particular reject causes may be treated as excepted defined reject causes and auxiliary back-off may be initiated when a service reject message includes the excepted defined reject causes. In one example, the auxiliary back-off may be implemented for use when a service request sent to a network is unsuccessful and a service reject message is received from the network including a reject cause and an associated network indicated back-off timer by which the network defines a back-off procedure. In this example where the network defines the back-off in the service reject message, the received reject cause and the associated particular network indicated back-off timer may be considered an excepted defined reject cause, based on the inclusion of the particular back-off timer FIG. 2C may be explained using device 102 of FIG. 1A as an example device that includes circuitry/processors and program instructions configured to implement the functional blocks of FIG. 1B. The process begins at 256 where device 102 transmits a service request on uplink 103 to eNode B 112. Service requestor 114 of FIG. 1B may initiate transmission of the service request on uplink 103 upon receiving a request service signal 124 generated within device 102 when device 102 needs service on data bearer channels. This may occur when device 102 has outgoing data to transmit or upon device 102 receiving a page from network 108 indicating that the network has data to be transmitted to device 102. Service requestor 114 may then generate a service request signal 128 within device 102 that causes device 102 to transmit the service request on uplink 103.

At 258, device 102 determines whether or not the service request was successful. Service request response/ignore handler 116 may perform the determination at 258 based on an event including receiving an indication of a service request response 130 received by device 102 on downlink 105. As part of the determination at 258, service request response/ignore handler 116 may also perform the determination based on an event on the event of not receiving or receiving a service request response from the network within a predetermined time period after the service request was sent.

If service response/ignore handler 116 determines at 258 that a service request response indicates the service request was successful the process moves to 260. At 260 service response/ignore handler 116 provides an indication to service requestor 114 of the successful access and service requestor 114 provides a request granted indication 126 to the device. Device 102 then accesses service on the requested data bearer channels.

If service response/ignore handler 116 determines at 258 that the service request response was unsuccessful, i.e., a service request response includes a reject message, or, no response was received to the service request within the predetermined time period because the service request was received by the network and ignored, or because the service request was not received by the network, the process moves to 262.

At 262, service response/ignore handler 116 determines whether any service request response was received from network 100 indicating a reject cause for the unsuccessful service request. It no service request response was received from network 100 indicating a reject cause for the unsuccessful service request, or no service request response was received from network 100 because the network did not receive or ignored the request, the process moves to 264.

If, however, at 262 it is determined that service request response including a reject cause was received, service request response/ignore handler 116 sends a query to reject cause database 122 to determine if the indicated reject cause is defined and associated in device 102 with a defined back-off procedure. At 262, service request response/ignore handler 116 also determines if the service reject message included a reject cause and also indicated a defined back-off timer value associated with the indicated reject cause.

If the indicated reject cause is associated with a defined back-off procedure in reject causes database 122 or if the service reject message included a reject cause and also indicated a defined back-off timer value associated with the indicated reject cause, the process moves to 270.

When the process has moved to 264 from 262, service request response/ignore handler 116 sends a query to, auxiliary back-off controller 118 to determine whether or not the auxiliary back-off is enabled. Auxiliary back-off may be selectively enabled or disabled by auxiliary back-off controller 118 receiving an enable/disable signal 132 generated by a user interface on device 102. The user interface may be configured to allow a user to select whether or not auxiliary back-off is to be enabled. In alternative implementations, the enable/disable signal 132 received at auxiliary back-off controller 118 may be generated upon device 102 receiving a remote control signal. For example device 102 may receive a control signal sent over the Internet or receive control signal sent from network 100 by an operator of network 100.

If the auxiliary back-off is not enabled, the process moves to 268 and service request response/ignore handler 116 sends an indication to service requestor 114 to continue without auxiliary back-off. Service requestor 114 then initiates the transmission of subsequent service requests without using any back-off. If service request response/ignore handler 116 determines that auxiliary back off is enabled the process moves to 266 where auxiliary back-off controller 116 performs auxiliary back-off by controlling service requestor 114 and service request response/ignore handler 116.

The auxiliary back-off performed at 266 by auxiliary back-off controller 118 may include use of a maximum attempt counter that controls service requestor 114 so that service requestor 114 may initiate transmission of multiple unsuccessful service requests before the auxiliary back-off timer is actually initiated. In an implementation of this maximum attempt counter in FIG. 1B, the auxiliary back-off controller 118 may keep a count of unsuccessful service requests. This may include service requests with network responses indicating an undefined reject cause, or unsuccessful service requests that were ignored by the network. If the maximum attempt counter is less than a predetermined value for maximum allowed unsuccessful attempts, the auxiliary back-off controller 118 will control service request response/ignore handler 116 and service requestor 114 to continue to retransmit service requests until the maximum number of unsuccessful attempts is reached. When the maximum number of allowed unsuccessful attempts is reached by the maximum attempt counter, auxiliary back-off controller 118 initiates an auxiliary back-off timer and provides appropriate signals to indicate to service requestor 114 and service response/ignore handler 116 that service requests are not to be transmitted during the auxiliary back-off period. When the auxiliary back-off timer expires, the process returns to 256 and service requestor 114 and service response/ignore handler 116 start the process of sending service requests again.

If the process moved to 270 from 262, service request response/ignore handler 116 determines whether the reject cause with the defined back-off is an excepted reject cause. In an example implementation, request response/ignore handler 116 may determine whether the reject cause is an excepted reject cause by determining whether the service reject massage included a reject cause and an particular timer value associated with the reject cause. For example, in an implementation in an LIE network, if a reject cause indication is accompanied by an information element (IE) that includes a specific timer indication such as a T3346 or T3443 timer the reject cause may be determined to be an excepted rejected cause. In other implementations any other reject causes and/or specific timer indications may be designated excepted reject cause depending on the configuration of the auxiliary back-off. If it is determined that the reject cause with the defined back-off is not an excepted reject cause the process moves to 272 where service request response/ignore handler 116 sends an indication to defined back-off controller 120 indicating that defined back-off controller 120 should control service requestor 114 to perform the defined back off procedure. If the indicated reject cause with the defined back-off is an excepted defined back-off procedure, the process moves to 273.

At 273, service request response/ignore handler 116 sends a query to auxiliary back-off controller 118 to determine whether or not the auxiliary back-off is enabled. Auxiliary back-off may be selectively enabled or disabled by auxiliary back-off controller 118 receiving an enable/disable signal 132 generated by a user interface on device 102. The user interface may be configured to allow a user to select whether of not auxiliary back-off is to be enabled. In alternative implementations, the enable/disable signal 132 received at auxiliary back-off controller 118 may be generated upon device 102 receiving a remote control signal. For example device 102 may receive a control signal sent over the internet or receive control signal sent from network 100 by an operator of network 100.

If the auxiliary back-off is not enabled, the process moves to 272 and service request response/ignore handler 116 sends an indication to service requestor 114 to continue with the defined back-off. Service requestor 114 then initiates the transmission of subsequent service requests using the network defined timer. If service request response/ignore handler 116 determines that auxiliary back-off is enabled the process moves to 274.

At 274, service request response/ignore handler sends an indication to auxiliary back-off controller to perform the excepted defined back-off according to the back-off defined by the network in the service reject message (e.g. by a timer IE) until a service request is successful or until a maximum attempt counter reaches a maximum value. The maximum attempt counter may be the same counter used in auxiliary back-off as described for operation 266 above. The maximum attempt counter may control service requestor 114 so that service requestor 114 may initiate transmission of service requests according to the network defined timer up to the maximum value. Next, the process moves to 276. At 276, it is determined if operation 276 was entered because a service request was successful at 274. If it is determined that a service request was successful, the process moves to 278 where device 102 accesses the requested service. If, however, no service request was successful at 274, operation 276 was entered because the maximum attempt counter maximum value has been reached, and the process moves to 266 where the auxiliary back-off is performed. The auxiliary back-off performed at 266 when entered from operation 276 may be performed in the same manner as described above for operation 266, where operation 266 was entered from operation 264.

Figure 3A:
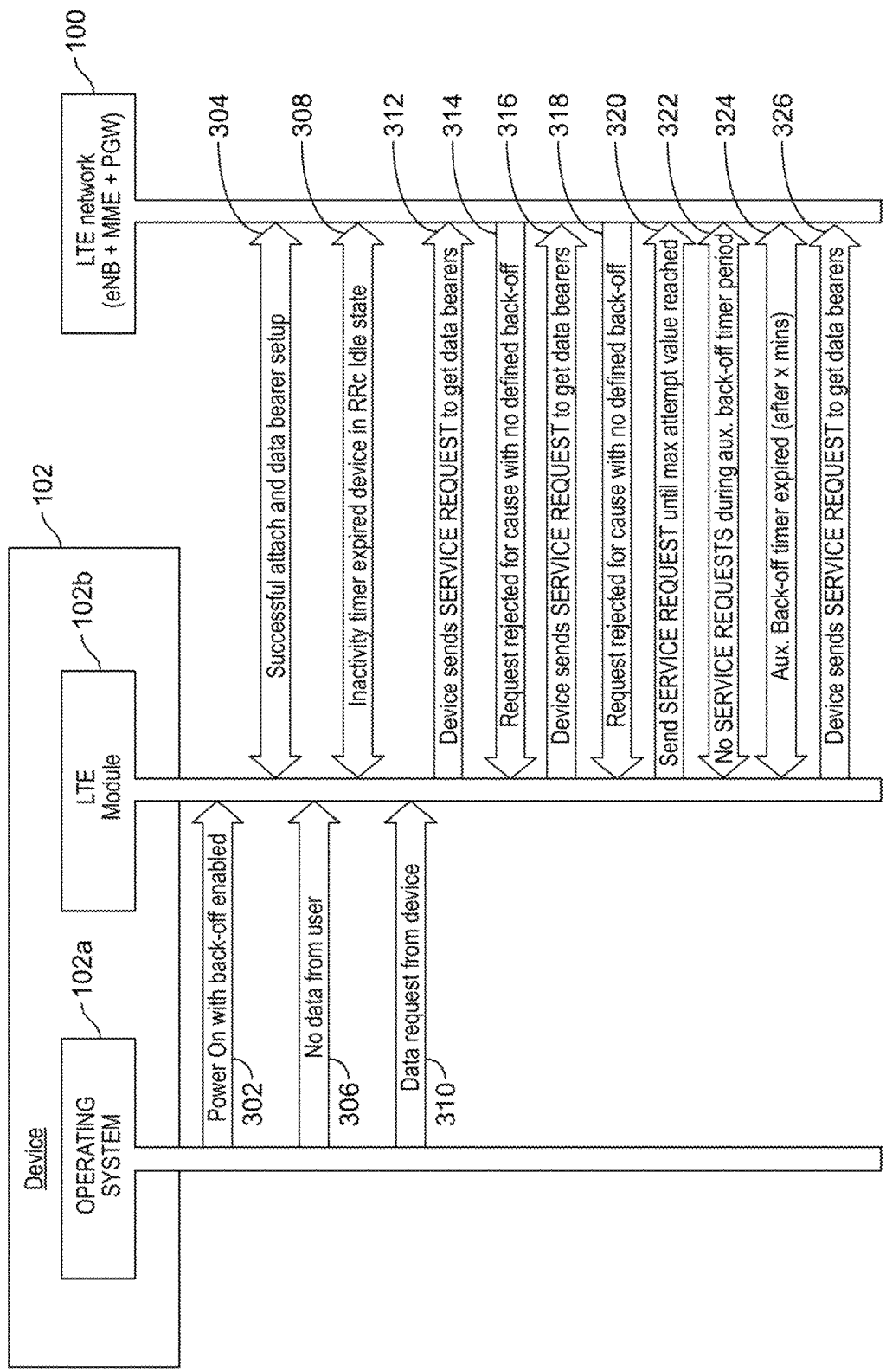
FIG. 3A is a signal flow diagram illustrating example auxiliary back-off signal exchanges when a service request reject message with a undefined cause is received by a device.

Referring now to FIG. 3A, therein is a signal flow diagram illustrating example signal exchanges involved, in auxiliary bark-off when a service request reject message with an undefined cause is received by example device 102 of FIGS. 1A and 1B. FIG. 3A shows signal exchanges between device 102 and network 100. FIG. 3A also shows signal exchanges between operating system 102a and LTE module 102b of device 102 when auxiliary back-off is enabled.

At 302, when auxiliary back-off is enabled, operating system 102a signals LTE module 102b that device 102 has been powered on. At 304, device 102 and LTE network 100 exchange signals through eNode B 112 to successfully attach device 102 to network 100 and set up data bearer channels for data transfer. At 306, operating system 102a indicates to LTE module 102b that there is no more data to transmit. At 308, an inactivity timer expires for device 102 and the device enters the radio resource control (RRC) idle state.

At 310, operating system 102a indicates to LTE module 102b that there is now data to transmit. Device 102 then sends, at 312, a service request to network 100 for data bearer channels. At 314, device 102 receives a reject message from network 100 indicating a reject cause having no defined back-off configured in device 102. At 316, device 102 then sends another service request to network 100 for data bearer channels. At 318, device 102 again receives a reject message indicating a reject cause having no defined back-off configured in device 102. At 320, device 102 continues to send service requests to network 100 until the maximum value of the maximum attempt counter is reached for auxiliary back-off. Then at 322, the auxiliary back-off timer in device 102 is started and no service requests are sent to network 100 until the auxiliary back-off timer expires. At 324, the auxiliary back-off timer expires and, at 326, device 102 exits the auxiliary back-off procedure and transmits a new service request to network 100. The exchange between device 102 and network 100 will then continue until a service request results in a successful service grant by network 100 in response to a service request, or, as long as auxiliary back-off is enabled, continue to repeat the flow of 312-326 if no service request results in a successful service grant by network 100.

Figure 3B:
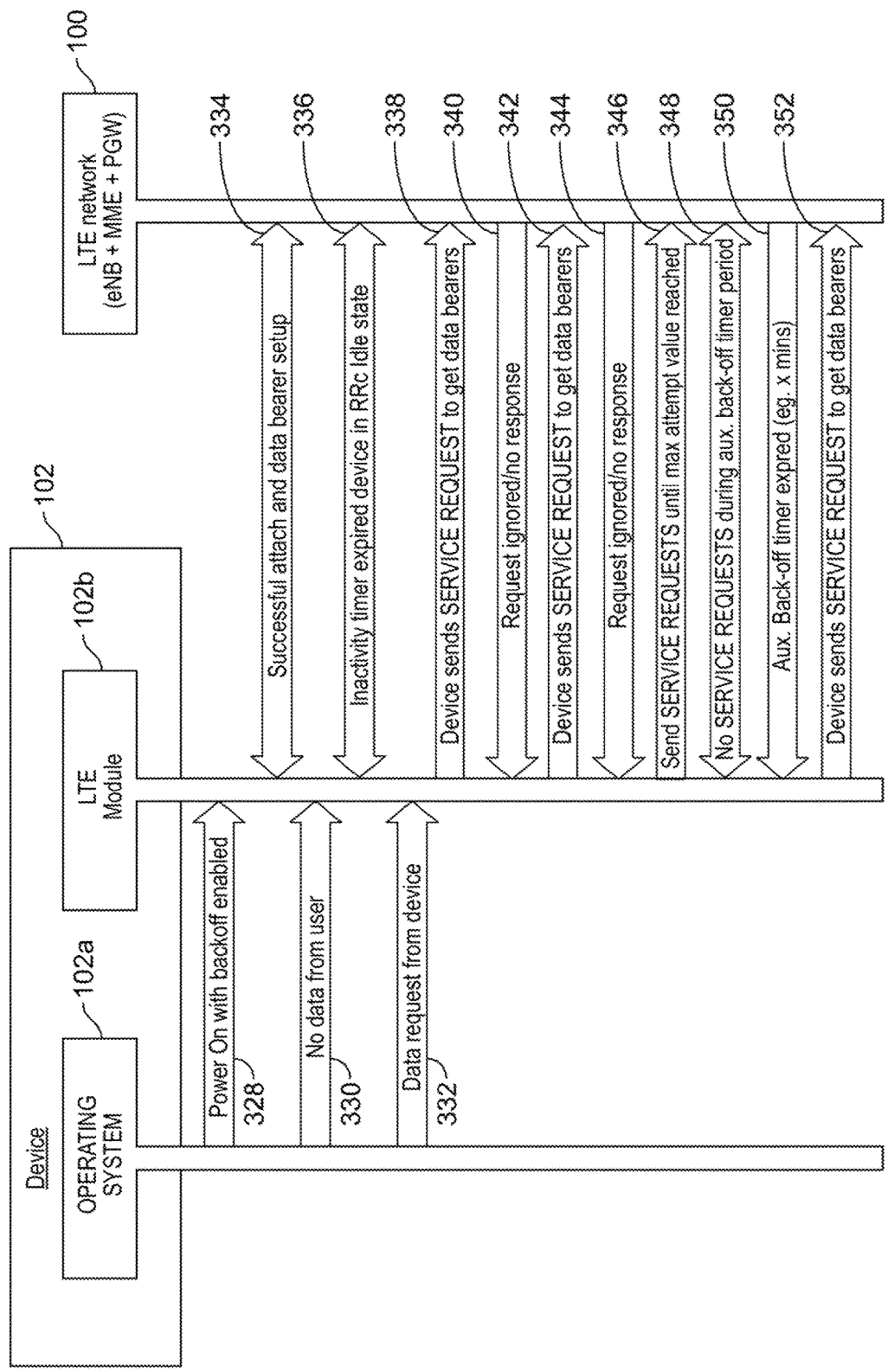
FIG. 3B is a signal flow diagram illustrating example auxiliary back-off signal exchanges when a service request sent by a device is ignored; and, FIG. 4 is a simplified block diagram illustrating an example device.

Referring now to FIG. 31B, therein is a signal flow diagram illustrating example auxiliary back-off signal exchanges when a service request sent, by example device 102 of FIGS. 1A and 1B is ignored. FIG. 3B shows signal exchanges between device 102 and network 100, and between operating system 102a and LTE module 102b of device 102.

At 328, when auxiliary back-off is enabled, operating system 102a signals LTE module 102b that device 102 has been powered on. At 334, device 102 and LTE network 100 exchange signals through eNode B 112 to successfully attach device 102 to the network 100 and set up data bearer channels for data transfer. At 330, operating system 102a indicates to LTE module 102b that there is no more data to transmit. At 336, an inactivity timer expires for device 102 and the device enters the radio resource control (RRC) idle state.

At 332, operating system 102a indicates to LTE module 102b that there is now data to transmit. Device 102 then sends, at 338, a service request to network 100 for data bearer channels. At 340, device 102 determines that the service request has been ignored, i.e., no response has been received from network 100. The determination that no response has been received may be made based on no response being received from network 100 within a predetermined time period after the service request is sent. At 342, device 102 then sends another service request to network 100 for data bearer channels. At 344, the service request is again ignored. At 346, device 102 continues to send service requests to network 100 that are ignored, until the maximum value of the maximum attempt counter is reached for auxiliary back-off. Then at 348 the auxiliary back-off timer in device 102 is started and no service requests are sent to network 100 until the auxiliary back-off timer expires. At 350, the auxiliary back-off timer expires and, at 352, device 102 exits the auxiliary back-off procedure and transmits a new service request to network 100. The exchange between device 102 and network 100 will then continue until a service request results in a successful service grant by network 100 in response to a service request, or, as long as auxiliary back-off is enabled, continue to repeat the flow of 338-352 if network 100 continues to ignore service requests sent by device 102.

Figure 4:
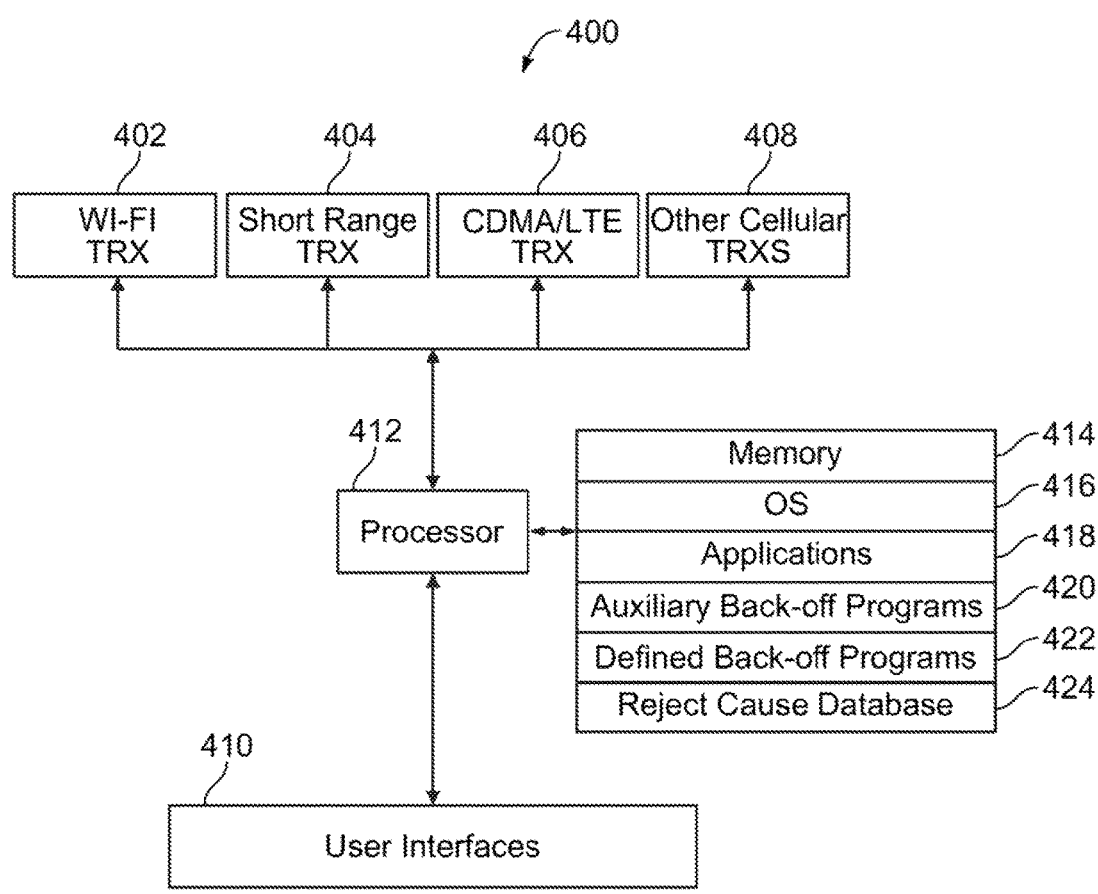

Referring now to FIG. 4, therein is a simplified block diagram of an example device 400. The functions for auxiliary back-off shown in FIG. 1B may be implemented on a device such as device 400. In an example implementation, device 400 may be a mobile device, such as devices 102, 104, and 106 of FIG. 1A, operating according to a wireless communication standard such as the 3GPP long term evolution (LTE) standard. In other example implementations, device 400 may operate according to any other communication standard in which the auxiliary back-off of the embodiments would be useful. These other communications standards may include, for example, the various IEEE 802.11 Wi-Fi standards or other cellular network standards. Device 400 may include a processor 412, memory 414, user interfaces 410, Wi-Fi transceiver (TRX) 402, short range transceivers (TRX) 404, WCDMA/LTE transceiver (TRX) 406 and other cellular transceivers (TRX) 408. The other cellular TRX may include, for example, a GSM transceiver. Memory 414 may be implemented as any type of computer readable storage media, including non-volatile and volatile memory. Memory 414 is shown as including program instructions for device operating system (OS) 416, device applications 418, auxiliary back-off programs 420, defined back-off programs 422, and reject cause database 424. Processor 412 may comprise one or more processors, or other control circuitry, or any combination of processors and control circuitry. Processor 412 provides overall control of device 400 by executing the program instructions in memory 414 in order to implement the functions for performing auxiliary back-off according to the disclosed embodiments. In implementations of device 400, processor 412 may execute program instructions in memory 414 to execute the functions shown in FIG. 1B that are described in relation to FIG. 2A, FIG. 2B, and FIG. 2C. User interfaces 410 may include any type of interface such as a touchscreen, a keypad, a voice controlled inter face, interfaces that are, gesture or motion based, an interface that receives input wirelessly, or any other type of interface that allows a user to selectively enable and disable the auxiliary back-off of the embodiments.

In example implementations, device 400 may be any type of device configured to communicate with a network such as network 100. For example, device 400 may be implemented as a smart phone, a tablet computer, a desktop computer, laptop computer device, gaming devices, media devices, smart televisions, multimedia cable/television boxes, smart phone accessory devices, tablet accessory devices, or personal digital assistants (PDAs).

The example embodiments disclosed herein may be described in the general context of processor-executable program instructions stored on memory that may comprise one or more computer readable storage media (e.g., tangible non-transitory computer-readable storage media such as memory 414). As should be readily understood, the terms "computer-readable storage media" or "non-transitory computer-readable media" include the media for storing of data, and/or program instructions, such as memory 414, and do not include portions of the media for storing transitory propagated or modulated data communication signals.

While implementations have been disclosed and described as having functions implemented on particular wireless devices operating in a network, one or more of the described functions for the devices may be implemented on a different one of the devices than shown in the figures, or on different types of equipment operating in different systems.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any appropriate functional blocks, type of processor, circuitry or combinations of processors and/or circuitry and code. This may include, at least in, part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

Embodiments of methods and apparatus have been disclosed that include a device comprising one or more processors and memory in communication with the one or more processors, the memory comprising code, that when executed, causes the one or more processors to control the device to transmit a service request to a network, determine that the service request has been unsuccessful based on an event, determine if a first back-off procedure is defined for the event and, if the first back-off procedure is not defined for the event, determine if a second back-off procedure is enabled and perform the second back-off procedure if the second back-off procedure is enabled. The service request may comprise a first service request and the program instructions may further cause the one or more processors to control the device to initiate one or more second service requests if the second back of procedure is not enabled. The event may comprise receiving a reject message including an indication of a reject cause. The program instructions may further causes the one or more processors to determine if a first back-off procedure is defined for the event by controlling the device to determine if the indication of the reject cause is defined and associated with a defined back-off procedure. The program instructions may further causes the one or more processors to determine if the indication of the reject cause is associated with a defined back-off procedure by controlling the device to determine, in response to a determination that the indication of the reject cause is associated with a defined back-off procedure, if the reject cause is an excepted reject cause, and, if the reject cause is an excepted reject cause, determine if a second back-off procedure is enabled, perform at least a portion of the defined back-off procedure, and, perform the second back-off procedure if the second back-off procedure is enabled. The event may comprise the network ignoring the service request. The program instructions may further cause the one or more processors to control the device to receive input from a user interface that enables or disables the second back-off procedure. The network service request may comprise a service request for one or more data bearer channels. The service request may comprise an LTE service request message.

In further implementations the service request may comprise a first network service request and the program instructions may further cause the one or more processors to perform the second back-off procedure by controlling the device to increment a counter, determine if the counter is set to a maximum attempt value, activate a timer if the counter is set to the maximum attempt value, and, back-off from sending any second network service request until the timer expires. Also, the service request may comprise a first service request and the program instructions may further cause the one or more processors to perform the second back-off procedure by controlling the device to increment a counter, determine if the counter is set to a maximum attempt value, and, initiate a second service request if the service request counter is not set to the maximum attempt value.

The disclosed embodiments also include a method comprising transmitting a service request to a network, determining that the service request has been unsuccessful based on an event, determining if a first back-off procedure is defined for the event, and, if the first back-off procedure is not defined for the event, determining if a second back-off procedure is enabled, and, performing the second back-off procedure if the second back-off procedure is enabled. The network service request may comprise a first network service request and the method may further comprise initiating one or more second network service requests if the second back off procedure is not enabled. The event may comprise receiving a reject message including an indication of a reject cause. The determining if a first back-off procedure is defined for the event may comprises determining if the indication of—the reject cause is defined and associated with a defined back-off procedure. The determining if the indication of the reject cause is associated with a defined back-off may comprises determining, response to a determination that the indication of the reject cause is associated with a defined back-off procedure, if the reject cause is an excepted reject cause, and, if the reject cause is an excepted reject cause, determining if a second back-off procedure is enabled, performing at least a portion of the defined back-off procedure, and, performing the second back-off procedure if the second back-off procedure is enabled.

The event may comprise the network ignoring the service request. The method may further comprise receiving input from a user interface that enables or disables the second back-off procedure. The service request may comprise a first network service request and the performing the second back-off procedure may comprise incrementing a counter, determining if the first counter is set to a maximum attempt value, activating a timer if the counter is set to the maximum attempt value, and backing off from sending any second network service request until the timer expires.

The disclosed embodiments further include a device comprising a user interface, one or more processors in communication with the user interface, and memory in communication with the processor, the memory comprising code, that when executed, causes the one or more processors to control the device to receive input at the user interface, the input enabling an auxiliary back-off procedure send a service request to a network, determine that the service request has been unsuccessful based on an event, determine that a defined back-off procedure is not configured for the event, determine that the auxiliary back-off procedure is enabled, and, perform the auxiliary back-off procedure. The memory may further include a database comprising one or more defined causes, each of the one or more defined causes associated with one of one or more defined back-off procedures, and the program instructions may cause the one or more processors to control the device to determine that the service request has been unsuccessful by determining that a reject message indicating a first cause was received in response to the network service request, and, determine that a defined back-off procedure is not configured for the event by determining that the first cause is not associated with any of the one or more defined back-off procedures.

The program instructions may further cause the one or more processors to control the device to determine that the service request has been unsuccessful by determining that no response was received for the network service request, and, determine that a defined back-off procedure is not configured for the event based on the determination that no response was received for the service request. The service request may comprise a first service request and the program instructions further causes the one or more processors to perform the first back-off procedure by controlling the device to increment a counter, determine if the counter is set to a selected value, wherein the selected value indicates a maximum number of service requests sent from the device, activate a tinier if the counter is, set to the selected value, and back-oft from sending any second service request until the timer expires. The service request may comprise a first service request and the program instructions further causes the one or more processors to perform the second back-off procedure by controlling the device to increment a counter, determine if the counter is not set to a selected value, wherein the selected values indicates a maximum number of services requests sent from the device, and, initiate a second service request if the counter is not set to the selected value.

Although the subject matter has been described in language specific to structural features and/or methodological operations or acts, it is to be understood that the subject matter defined in the appended claims is not necessarily limited to the specific features, operations, or acts described above. Rather, the specific features, operations, and acts described above are disclosed as example embodiments implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as failing within the scope of the appended claims.

What is claimed is:

1. A device comprising:
one or more processors; and,
memory in communication with the one or more processors, the memory comprising program instructions, that when executed, causes the one or more processors to control the device to:
transmit a service request to a network;
determine that the service request has been unsuccessful based on an event;
determine if a first back-off procedure is defined for the event;
and, if the first back-off procedure is not defined for the event;
determine if a second back-off procedure is enabled; and,
perform the second back-off procedure if the second back-off procedure is enabled.

2. The device of claim 1, wherein the service request comprises a first service request and the program instructions further cause the one or more processors to control the device to initiate one or more second service requests if the second back-off procedure is not enabled.

3. The device of claim 1, wherein the event comprises receiving a reject message including an indication of a reject cause.

4. The device of claim 3, wherein the program instructions further cause the one or more processors to determine if a first back-off procedure is defined for the event by controlling the device to:
determine if the indication of the reject cause is defined as associated with the first back-off procedure.

5. The device of claim 4, wherein the program instructions further cause the one or more processors to determine if a first back-off procedure is defined for the event by controlling the device to:
determine, in response to a determination that the indication of the reject cause is associated with the first back-off procedure, if the reject cause is an excepted reject cause;
and, if the reject cause is an excepted reject cause:
determine if the second back-off procedure is enabled;
perform at least a portion of the first back-off procedure; and,
perform the second back-off procedure if the second back-off procedure is enabled.

6. The device of claim 1, wherein the event comprises the network ignoring the service request.

7. The device of claim 1, wherein the program instructions further cause the one or more processors to control the device to receive input from a user interface that enables or disables the second back-off procedure.

8. The device of claim 1, wherein the service request comprises a first service request and the program instructions further cause the one or more processors to perform the second back-off procedure by controlling the device to:
increment a counter;
determine if the counter is set to a maximum attempt value;
activate a timer if the counter is set to the maximum attempt value; and,
back-off from sending any second service request until the timer expires.

9. The device of claim 1, wherein the service request comprises a first service request and the program instructions further cause the one or more processors to perform the second back-off procedure by controlling the device to:

increment a counter;
determine if the counter is set to a maximum attempt value; and,
initiate a second service request if the counter is not set to the maximum attempt value.

10. A method comprising:
transmitting a service request to a network;
determining that the service request has been unsuccessful based on an event;
determining if a first back-off procedure is defined for the event;
and, if the first back-off procedure is not defined for the event:
  determining if a second back-off procedure is enabled; and,
  performing the second back-off procedure if the second back-off procedure is enabled.

11. The method of claim 10, wherein the service request comprises a first service request and the method further comprises initiating one or more second service requests if the second back off procedure is not enabled.

12. The method of claim 10, wherein the event comprises receiving a reject message including an indication of a reject cause.

13. The method of claim 12, wherein the determining if a first back-off procedure is defined for the event comprises:
determining if the indication of the reject cause is defined as associated with the first back-off procedure.

14. The method of claim 13, wherein the determining if a first back-off procedure is defined for the event further comprises:
  determining, in response to a determination that the indication of the reject cause is associated with the first back-off procedure, if the reject cause is an excepted reject cause;
  and, if the reject cause is an excepted reject cause:
    determining if the second back-off procedure is enabled;
    performing at least a portion of the first back-off procedure; and,
    performing the second back-off procedure if the second back-off procedure is enabled.

15. The device of claim 10, wherein the event comprises the network ignoring the service request.

16. The method of claim 10, wherein the method further comprises receiving input from a user interface that enables or disables the second back-off procedure.

17. A device comprising:
a user interface;
one or more processors in communication with the user interface; and,
  memory in communication with the one or more processors, the memory comprising program instructions, that when executed, causes the one or more processors to control the device to:
  receive input at the user interface, the input enabling an auxiliary back-off procedure;
  send a service request to a network;
  determine that the service request has been unsuccessful based on an event;
  determine whether a defined back-off procedure is configured for the event;
  determine, in response to defined back-off procedure not being configured for the event, whether the auxiliary back-off procedure is enabled; and,
  perform, in response to a determination that the auxiliary back-off is enabled, the auxiliary back-off procedure.

18. The device of claim 17, wherein the program instructions cause the one or more processors to control the device to determine that the service request has been unsuccessful by determining that a reject message indicating a reject cause was received in response to the service request.

19. The device of claim 18, wherein the program instructions further causes the one or more processors to determine whether a defined back-off procedure is configured for the event by controlling the device to determine if the reject cause is defined as associated with a defined back-off procedure.

20. The device of claim 19, wherein the program instructions further causes the one or more processors to determine if the indication of the reject cause is associated with a defined back-off procedure by controlling the device to:
  determine, in response to a determination that the indication of the reject cause is associated with the defined back-off procedure, if the reject cause is an excepted defined reject cause;
  and, if the reject cause is an excepted defined reject cause:
    determine if the auxiliary back-off procedure is enabled;
    perform at least a portion of the defined back-off procedure; and,
    perform the auxiliary back-off procedure if the auxiliary back-off procedure is enabled.

* * * * *